US012463980B2

(12) United States Patent
Miel et al.

(10) Patent No.: US 12,463,980 B2
(45) Date of Patent: Nov. 4, 2025

(54) MID-SESSION TRUST ASSESSMENT (71) Applicant: Cisco Technology, Inc., San Jose, CA (US)

(72) Inventors: Shayne Miel, Durham, NC (US); Josh Matz, Ann Arbor, MI (US); Nancy Cam-Winget, Mountain View, CA (US); Joshua Terry, Round Rock, TX (US); Brian Lindauer, Austin, TX (US); David William Matteson, Dexter, MI (US); Jen Bammel, Dexter, MI (US); Courtney Irwin, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 18/177,502

(22) Filed: Mar. 2, 2023

(65) Prior Publication Data
US 2024/0297887 A1    Sep. 5, 2024

(51) Int. Cl.
*H04L 9/40*    (2022.01)
(52) U.S. Cl.
CPC ........ *H04L 63/108* (2013.01); *H04L 63/0876* (2013.01); *H04L 63/105* (2013.01)

(58) Field of Classification Search
CPC . H04L 63/108; H04L 63/0876; H04L 63/105; H04L 63/08; H04L 63/20
See application file for complete search history.

(56) References Cited

U.S. PATENT DOCUMENTS

| | | | |
|---|---|---|---|
| 2016/0277448 A1* | 9/2016 | Saida | H04M 1/72463 |
| 2018/0139200 A1 | 5/2018 | Gordon et al. | |
| 2019/0009531 A1 | 1/2019 | Furukawa | |
| 2019/0097995 A1* | 3/2019 | Chickering | H04L 67/146 |
| 2021/0044623 A1* | 2/2021 | Bosch | G06F 21/575 |
| 2022/0210173 A1* | 6/2022 | Katmor | H04L 63/1416 |
| 2023/0239283 A1* | 7/2023 | Bambenek | H04L 63/20 726/22 |

* cited by examiner

*Primary Examiner* — Khoi V Le
(74) *Attorney, Agent, or Firm* — Polsinelli P.C.

(57) ABSTRACT

The present technology provides for receiving communications at an authentication service, and the communication is indicative of a change in a security posture of an authenticated session between a user device and a secure service. The authentication service can then determine that the change in the security posture of the authenticated session impacts the trust level associated with the user device and causes the trust level to fall below the threshold. The authentication service can then send an enforcement signal to a security agent on a network device that provides remedial actions that a user can undertake to improve the security posture of the authenticated session.

20 Claims, 5 Drawing Sheets

MID-SESSION TRUST ASSESSMENT

TECHNICAL FIELD

The present disclosure relates to identifying risk factors that arise during an authenticated session and how to address those risk factors. During authenticated sessions, the trust profile of the user or user device can change, and the disclosure relates to how to assess the change, protect the secured communications, and mitigate any risk factors.

BACKGROUND

Communications between users and secured websites often rely on authentication to secure the communication channels between the user device and the secured site. Traditionally, as the user accesses a secure website, the secure website can accept a user login and authenticate the user. While this process works well at authenticating the user at the beginning of a secure session, the system does not assess the ongoing security or authenticity of the user or user device during the secure session. The secure website would not inquire about the security or authenticity of the user or user device until the next secure connection is initiated. Accordingly, a system that assesses the user and user device during the secure sessions is needed.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Certain aspects of this disclosure are provided below. Some of these aspects may be applied independently, and some may be applied in combination, as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Overview

The present technology assesses the trustworthiness of a user and/or user device after establishing a secured connection to a secured website or application. After establishing an authenticated session, an authentication service can continue to monitor the trust level or trust score of the user device and/or user to determine if the authenticated session remains secure. The authentication service can receive a communication from a security agent program on the user device or on the network that identifies a change in the security posture of the device or user. Based on this change, the system can undertake an analysis of the trust level of the user device or the user and determine if the trust level is above or below a threshold of trustworthiness. If the trust level remains above the required threshold of trustworthiness, then the authenticated connection can continue. If the trust level falls below a required threshold, the system will respond by sending an enforcement message to the security agent on the client device or the network. The enforcement signal will include instructions to the security agent to take remedial action to protect the authenticated connection, including pausing communications if needed.

The present technology solves the problems associated with a user's or user device's change in security posture during an authenticated session. Currently, there is a need in the art to address the inability to assess security events associated with a device or user while the device or user is taking part in an authenticated session. When a user's security posture changes while logged into a secure website, the current technology is able to dynamically assess that change, determine if the change reduces the trust level associated with the device or user below a threshold, and the trust level is below a threshold, alter the permissions associated with the user account.

The present technology also can adapt the authenticated session to the trust level associated with the user or device. The system has the ability to determine the events that take place to alter the trust level and then, based on those events, dynamically alter the permissions associated with the user account. For example, the system can reduce the availability of the network, terminate the connection, or move the connection to a more secure network, amongst other options that will be made clear from the following description.

The present technology can also alert the user to the event causing a lowering of the trust level associated with the user or device. For example, the system can provide a message to the user that indicates the event causing the trust level to fall below a threshold. For example, the system can alert the user that the access device is compromised, has a virus, or has an old password, amongst other events. Based on the message, the user can fix the problem that caused the trust level to fall below the threshold. When the problem is fixed, the system can reassess the trust level, and if it is above the threshold, it can reinstate the full permissions available to the user account. Furthermore, the threshold can be determined based on factors specified in a policy configured by a service provider. The policy specifies what conditions are required so that the user can initiate an authenticated session with the service provider. The policy can also indicate what conditions are required to maintain or reestablish an authenticated session with the service provider The present technology can send an enforcement signal to the access device that implements the remedial action, i.e., reduces permissions for the user account. The enforcement signal can change the permissions granted to the user account, which alters the communication available to the user device, and alters its access to the authenticated session. One example is that the enforcement signal can pause the authenticated session until the user is able to reauthenticate the user account by fixing the problems that led to the security events. Another example is the enforcement signal can end the authenticated session with the user device based on the events dropping the trust level below a threshold.

The enforcement signal can also be associated with a time period where the permissions are checked periodically and the permissions are altered periodically. The time period is one way to continually check the level of trust of the user or user device and update the permissions available to the user account based on an updated trust score.

The present technology also allows a device to reauthenticate the authenticated session after it is paused based on a change in security posture. The system is able to continue polling the authentication service, network security agent, and client security agent to determine if any of the contextual or security information is updated to improve the security score. When the user has made enough changes to increase the trust score, the authentication service resumes the normal operation of the secure communications. Other technical features may be readily apparent to one skilled in the art from the following figures, descriptions, and claims.

Detailed Description of Example Embodiments

Disclosed herein are systems and methods for assessing the security posture of a client device while the client device is accessing a secure environment. The trust measuring systems and methods disclosed herein use information regarding the status, location, and actions taken on client devices in real-time or close to real-time to determine if the client device is still secure. If the system determines that the client device is not secure, the system may restrict access to the secure sites and degrade the quality of service to the client devices.

When establishing an authenticated session with a secure service, users can be presented with a number of possible methods to authenticate their identity. These factors may include hash-based one-time password (HOTP) codes, phone calls, a push to a mobile application, web-based authentication (e.g., WebAuthN), etc. For example, a push to a mobile application, such as a push to Duo Mobile, typically includes the following steps: (1) a server receives a pre-authorization request (e.g., a user entered a password correctly, and now the server is being requested to send a push); (2) the server cross-checks information to make a determination on whether the characteristics associated with the user comply with a policy (e.g., a company user policy) which allows the user to access the requested service. After the confirmation, the server provides the push to the user, for example, by sending to a known device registered with the user a request for the user to acknowledge the sign-in request. This acknowledgment may be in the form of two confirmation buttons, one approving the request and one disapproving the request.

After the initial authenticated session is established, the system and/or user device can encounter situations that increase the amount of risk associated with the device connected to a secure environment. The system can collect information from multiple sources, which allows the authentication service to determine if the increased risks have altered the user or client device's trust score enough to require further mitigation steps prior to continuing the secured session. Based on the information collected, the system can continuously update the security assessment and determine if the session needs to be paused and, if so, what mitigation measures are needed to bring the secure session back into compliance with the risk management levels appropriate for a secure connection. Furthermore, pausing can include ending or terminating the authenticated session between the access device and the authentication service.

The system can collect different types of information, all of which can be weighed to determine if the access device has a risk score that is appropriate for the secure connection. For example, the system can assess events that are taking place at the device accessing the secure connection. Events that can be assessed include the time intervals between trusted signals. If the secure connection has no communications with the access device for an extended period of time, the lack of communication could indicate that the connection is stale, and a reauthentication and/or reauthorization of the secure connection is warranted. Further risk events at the device can include malware detected at the user device or the system recognizing that the use and/or the number of downloads is abnormally large. The security agent on the phone can also detect unusual patterns of behavior on the phone, which can indicate that risk events are taking place. These are all possible indications that the risk profile of the user device has increased, reducing the trust factor associated with the device, and requiring actions by the user to mitigate some risk factors before continuing with the secure connection.

The system also can receive information from the authentication service that indicates risk events have occurred. For example, the authentication service can keep track of recent password hacks and determine that a password associated with the user account has been compromised. Further, the authentication service can determine that the user account is attempting to sign on from a different location than a currently active secure session, which would indicate the user account is compromised. It is also possible for the system to determine that multiple IP addresses are being used to attempt to access a secure site. The authentication service can also determine that there is a risk of data loss from the access device and determine that a reduction of the risk score is needed. When any of these factors are found within the system, the system can determine that additional security measures are required.

The system, either the security agent on the access device or the authentication service, can also detect that an account is being attacked via risk vectors associated with multi-factor authentication. The system could recognize any of the push attacks that are fairly common; for example, push spray, push harassment, adversary-in-the-middle, and passcode phishing attacks are common types of attacks, all of which are made more susceptible by "push fatigue." This may occur because the user is distracted or overwhelmed by constant notifications, and it may be misinterpreted as a bug or confused with other legitimate authentication requests. Repeated multi-factor authentication requests result in users paying less attention to the details of their login, causing a user to mindlessly accept a push login or pay less attention to the site they are logging into, which may be fraudulent but look very similar to the legitimate site. These attacks are all particularly effective—not because of the technology involved, but because they target the human factor via social engineering. By recognizing these threat vectors, the system can determine that the risk profile of the account is increased and the need for reauthentication is necessary.

Figure 1:
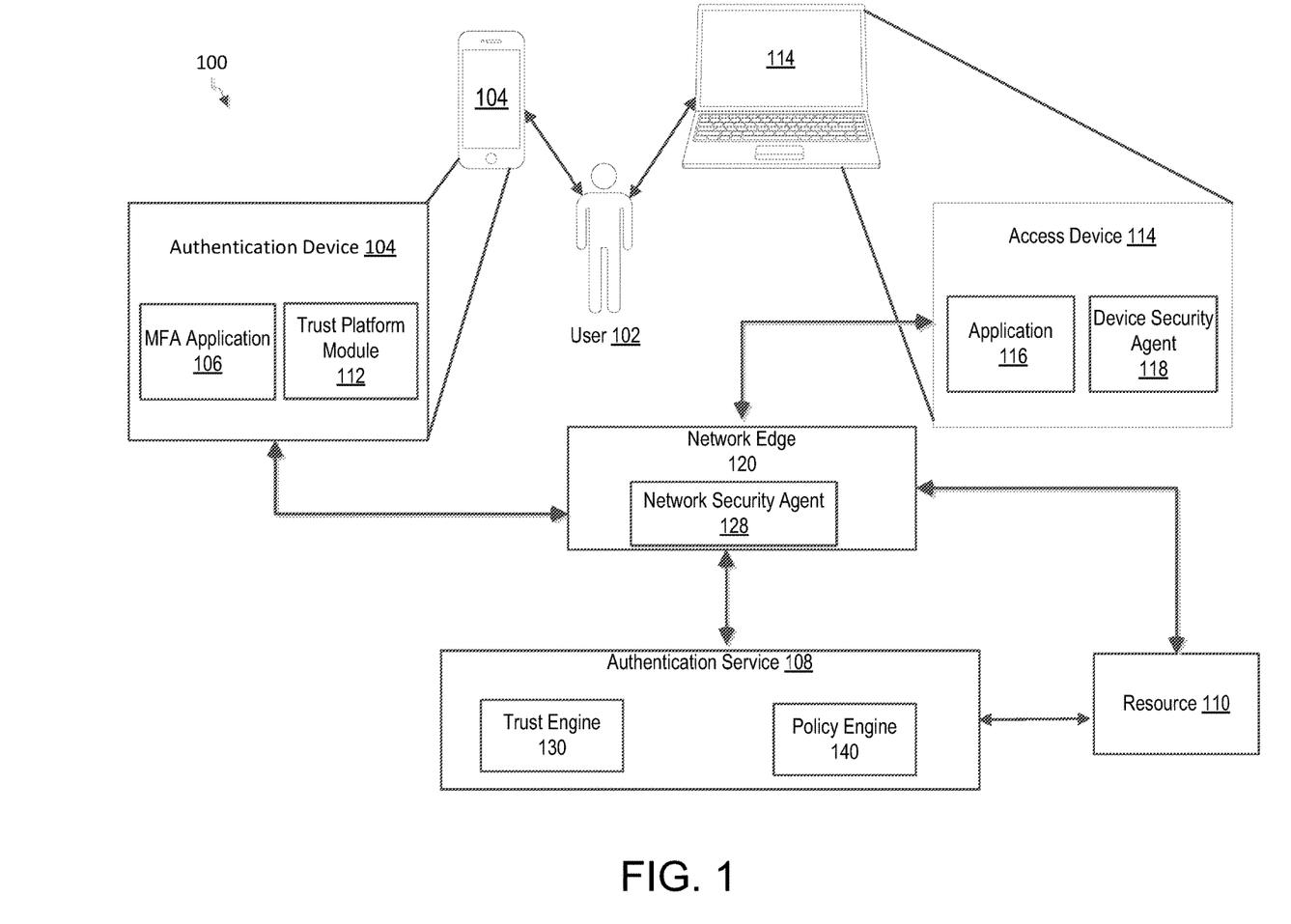
FIG. 1 illustrates an example system creating an authenticated connection in accordance with some aspects of the present technology.

FIG. 1 illustrates an example environment for assessing security during a secured network connection in accordance with some aspects of the present technology. User 102 can gain authorized access to resource 110 by using authentication device 104. User 102 can be any user, including an employee, contractor, client, member of an organization, or private individual, etc., attempting to access a service. The authentication device 104 can be hardware, software-only, or combinations thereof. The authentication device 104 can be a mobile device or a personal computer.

Resource 110 can be any service, resource, application, device, or entity which requires authentication of user 102. For example, resource 110 can be a social media service, bank, hospital, motor vehicle department, bar, voting system, Internet of Things (IoT) device, or access device. In some embodiments, resource 110 can be accessed by user 102 through an access device 114, such as a mobile phone or personal computer. In some embodiments, resource 110 can be accessed by user 102 through an application 116 on an access device 114 that is specifically designed for accessing resource 110, or through a more general application 116 that can access multiple services, such as a web browser or portions of an operating system. In some embodiments, resource 110 can be a plurality of resources, such as a network or enterprise system.

Resource 110 can authenticate the identity of user 102 on its own through the use of an authentication mechanism and can utilize the authentication service 108 to provide an additional factor of authentication to create a secure service. For example, user 102 can attempt to access resource 110 using access device 114 through network edge 120. In some embodiments, the access device 114 can also be the authentication device 104, such as when user 102 attempts to access the resource 110 using an app or browser on authentication device 104. The resource 110 can perform a first authentication mechanism by interacting with the access device 114. Thereafter, resource 110 can request additional authentications using authentication device 104.

In some embodiments, the additional authentication can include requesting a code generated by the authentication device 104. For example, the multi-factor authentication (MFA) application 106 might generate a pseudo-random number using a mechanism agreed upon with resource 110. This can be a standard two-factor authentication or can include additional authentication mechanisms. User 102 can operate the authentication device 104 to cause the MFA application 106 to generate the pseudo-random number, which user 102 can then enter into the access device 114 to achieve the additional authentication. In some embodiments, if the authentication device 104 is equipped with a trust platform module 112, the MFA application 106 can utilize the trust platform module 112 to generate the pseudo-random number.

In some embodiments, the additional authentication can include requesting a code or authorization generated by the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. The user can respond to the request for authentication on the authentication device 104 by interacting with the MFA application 106 to perform the required actions. When the required actions are properly performed, the MFA application 106 can send a communication informing the authentication service 108 of the successful authentication, and the authentication service 108 can inform the resource 110 of the successful authentication.

In some embodiments, the additional authentication can include requesting a code generated at resource 110 to be entered at the authentication device 104 by making the request through the authentication service 108. For example, the resource 110 can pass information identifying the user 102 to the authentication service 108 with a request for additional authentication. The authentication service 108 can send a request (typically a push request) for authentication to the authentication device 104, which is known to be a device associated with the user 102. In this example, the MFA application 106 presents a user interface requesting that the user 102 enter a code that is presented on the access device 114 that originated from the resource 110. The user can respond to the request for authentication on the authentication device 104 by interacting with the MFA application 106 to perform the required action by entering the code. When the code is properly entered, the MFA application 106 can send a communication informing the authentication service 108 of the code, and the authentication service 108 can pass the code to the resource 110, where the resource 110 will consider the additional authentication successful when the received code matches the code sent to the access device 114.

In some embodiments, the authentication device 104 and/or the access device 114 can also report context data to the authentication service 108. As addressed above, the authentication device 104 can include the MFA application 106 that can communicate with the authentication service 108. The access device 114 can include a device security agent 118 that can also communicate with the authentication service 108. Network edge 120 can also include a network security agent 128 that communicates with authentication service 108. The MFA application 106, the device security agent 118, and network security agent 128 can gather and send information to the authentication service 108. For example, the information can include biometric, behavioral, and contextual data from user 102. These biometrics can include, for example, fingerprints, facial detection, retinal scans, voice identification, or gait data, among other biometrics. The context data can include the time since the user last interacted with the device, changes to the network connection experienced by the device, information about the integrity of the operating system of the device, information about what operating system and what version of the operating system the device is running, among other examples. The context data can also include network information regarding changes to firewall settings, geographical details of log-on locations, and data loss prevention information, amongst other examples.

The system of FIG. 1 can include security agents 118 and 128. The security agent can be, for example, a plug-in in a browser or software on a network device that is capable of receiving and analyzing communications from the browser. In one example, access device 114 runs applications 116, including a browser. The browser application can have various plug-ins installed, including a plug-in associated with authentication service 108, which acts as device security agent 118. The device security agent 118 is in communication with the browser, the network edge 120, and authentication service 108. Similarly, the network security agent 128 can be a software application running on the network edge 120, which can also communicate with the device security agent 118, the authentication service 108, and resource 110. The device security agent 118 and network security agent 128 can both receive contextual data and operating instructions from authentication service 108, from application 116, from resource 110, from network edge 120, and/or determine the contextual data and operating instructions itself. In a specific example, the browser will recognize blocks of data that are significant, e.g., change security posture, from a specific website, etc., for the device security agent 118 and will identify those blocks for the plug-in to investigate. In another example, the network edge can receive all communications meant between the access device 114 and the resource 110, and network security agent 128 can intercept and review those communications to determine if there are any changes to the security posture of the access device, user, or network. The communications data that are significant can be communicated to the authentication service, where, in one embodiment, a trust score is calculated. In one embodiment, the authentication service 108 can then provide operating instructions to the device security agent 118 and/or network security agent 128, including instructions on how to handle changes in the security posture of the access device. In a further embodiment, the authentication service 108 can directly interact with resource 110, and resource 110 can provide information to authentication service 108 that indicates whether the user has access privileges to resource 110. For example, resource 110 can provide information that it has logged the user out of the secure service or that the user has been added to a deny access list at resource 110.

The system of FIG. 1 can also include a network edge 120. The network edge can be any networking device capable of running the network security agent 128. The network edge 120 can be wired or wireless without impacting the functionality of the network security agent 128. Further, the network edge can be a network gateway, network switch, proxy server, or access point, which also does not impact the functionality of the network security agent 128. The network edge 120 can be a single device or multiple devices that provide communications between the access device 114, authentication service 108, and resource 110.

The device security agent 118 and/or network security agent 128 can provide context data to authentication service 108 that determines if the device should be trusted to be used as part of the authentication process or trusted to access the resource 110. For example, the authentication service 108 can include a trust engine 130 and a policy engine 140. The trust engine 130 continuously intakes the information collected from the authentication device 104, the access device 114, network edge 120, and resource 110 to determine a trust level and/or trust score for the access device 114 and if the secured session should continue. Policy engine 140 includes the policy parameters that are important for the secured session of each authenticated party, e.g., resource 110. Each secure site can have its own policy rules that reflect what factors the particular secure site finds important. Some secure sites may focus more on data loss prevention and file downloads, while another secure site may choose to focus on device security and preventing hacks. Some secure services may need to include all available signals that raise questions about the trustworthiness of the access device 114 when deciding how to proceed with the secure connection. Once the secure site has provided indications of the signals that drive their chosen policy decisions, the policy engine can take the data from the trust engine and provide decisions on the access permissions of the access device 114. In some instances, the trust engine can indicate that something has changed about the user 102, the authentication device 104, the access device 114, or network edge 120 during an authenticated session with resource 110, and authentication service 108 can take certain actions depending on the configured policy at the policy engine 140 determines access permissions for the resource 110. However, if the trust engine reduces the trustworthiness, but the trustworthiness is still within the parameters of configured policy at the policy engine, then the access privileges can be maintained until further risk signals are received.

Figure 2:
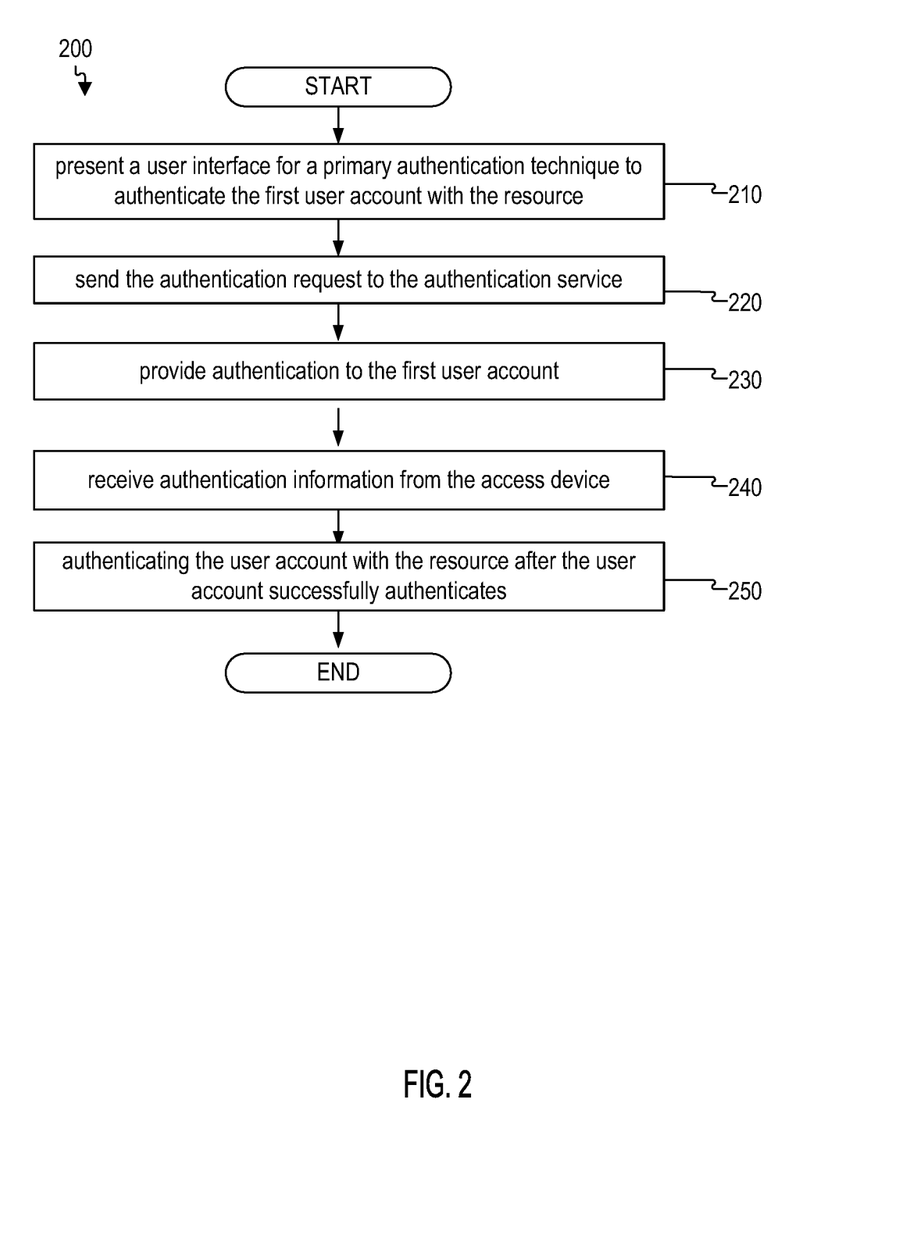
FIG. 2 illustrates an example method for creating an authenticated connection within a system in accordance with some aspects of the present technology.

FIG. 2 illustrates an example method 200 for authenticating a user wherein the method includes initiating authorization of a secure session between a user device and a secure service, e.g., resource 110. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes presenting a user interface for a primary authentication technique to authenticate the first user account with the resource at block 210. For example, the access device 114, illustrated in FIG. 1, may present a user interface for a primary authentication technique to authenticate the first user account with the resource (i.e., resource 110), such as through an application installed on the user's laptop (i.e., access device 114). As previously discussed, access device 114 may include hardware (e.g., a computer), software (e.g., a browser extension), a website (e.g., a web portal) hosted on a separate computing device, or any other application of the device capable of presenting the interface for a primary authentication technique. In some examples, the primary authentication technique is a username and password. In some examples, the primary authentication technique may be any authentication technique capable of verifying the user's 102 information.

According to some examples, the method includes sending the authentication request to the authentication service at block 220. For example, the resource 110 may send the authentication request to authentication service 108. In some examples, the authentication service is a two-factor authentication service. In this regard, the authentication service may require one or more factors to authenticate the user in various possible examples. In some examples, when more than two factors are considered, the authentication request can include contextual information associated with the access device 114 of the request and information identifying the resource 110. The authentication request may include contextual information associated with the request and/or the user 102, including the IP address of the access device, a browser version, identification of browser extensions, an operating system on the access device, a type of access device, time of day, geographical information, combinations of the same, etc., in various possible examples. In some examples, the contextual information associated with the access device 114, network edge 120, authentication device 104, and/or user 102 includes one or more of identifying a network from which the access device or authentication device is connected. In some examples, the request or contextual information includes information about the user, such as a name or username, password, user ID, combinations of the same, etc., in various possible examples.

The policy regarding authentication techniques that are sent in the authentication request can be established in multiple ways. For example, the resource 110 can rely on two-factor authentication to establish a connection between access device 114 and resource 110. In different embodiments, the authentication service 108 can set the policy associated with the resource 110 and rely on two-factor authentication or multi-factor authentication. In further embodiments, the policy may be set by the resource 110 or be set by an administrator or user of the resource 110. It should be noted that the policy associated with any particular authentication technique may be updated, adjusted, changed, or otherwise set for each user 102 or user account, groups of users or accounts, resource 110, authentication technique, the authentication device 104, authentication session, combinations of the same, etc., in various possible examples.

Further, in some embodiments, the resource 110 may want to increase the security of the connection and can rely on additional information when authenticating access device 114. For example, the resource 110 may rely on contextual information, which may include information that the user 102 is on a public network (e.g., accessing the internet on a laptop in a coffee shop), and the authentication service 108 may determine (e.g., based on the policy and the contextual information) that the user 102 may only utilize a push type authentication method, biometric authentication method. In this regard, the authentication service 108 and/or authentication device 104 may consider contextual information associated with the request and/or the user 102 to indicate a higher risk associated with allowing the user to use particular authentication techniques.

According to some examples, the method includes providing authentication to the first user account at block 230. For example, the authentication device 104 may provide the authentication technique to the first user account via a website or web portal, application, email, pop-up extension, notification (e.g., email), computing device, hardware device (e.g., a fingerprint reader), combinations of the same, etc., in various possible examples. In some examples, the authentication service 108 or the resource 110 may provide the authentication technique to the user via the authentication device 104 or the access device 114.

According to some examples, the method includes receiving authentication information from the access device at block 240. In some examples, the authentication service 108, authentication device 104, and/or resource 110 may require authenticating additional factors after the user 102 provides the primary authentication to mitigate the risks while allowing the user 102 to utilize resource 110. In this regard, one example includes receiving an access code from the authentication device for authentication verification at the authentication service 108, authentication device 104, and/or resource 110. Although not shown, method 200 may repeat any step, combine steps, skip steps, iterate steps, combinations of the same, etc., in various possible examples.

According to some examples, the method includes authenticating the user account with the resource after the user account successfully authenticates at block 250. In this regard, once the system determines that the user account is authenticated, the system can proceed with the default configuration and establish secure communications between the user device and the secure service, e.g., resource 110. In some examples, a rule or policy associated with the authentication service 108, authentication device 104, and/or resource 110 may determine during the authenticated session when further authentication is needed based on new information received by the system.

Figure 3A:
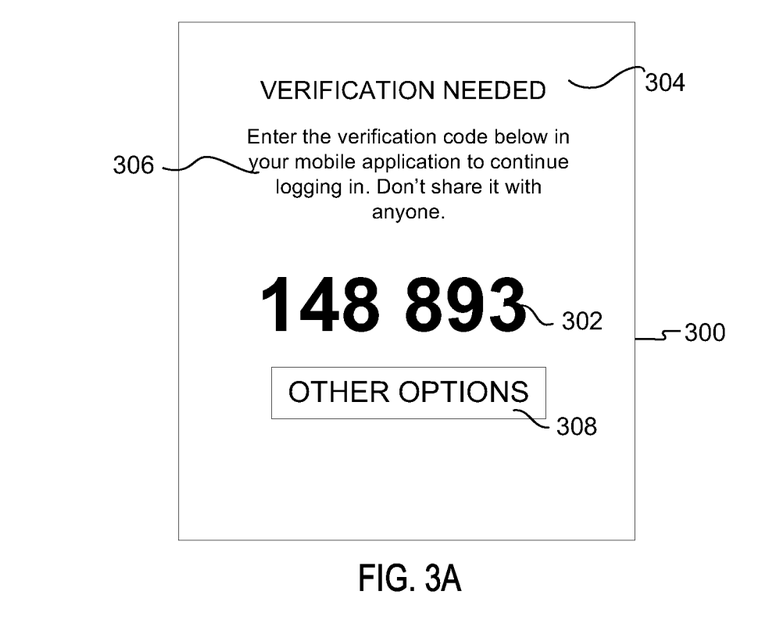
FIGS. 3A and 3B show an example of a particular authentication technique including a push in accordance with some aspects of the present technology.
Figure 3B:
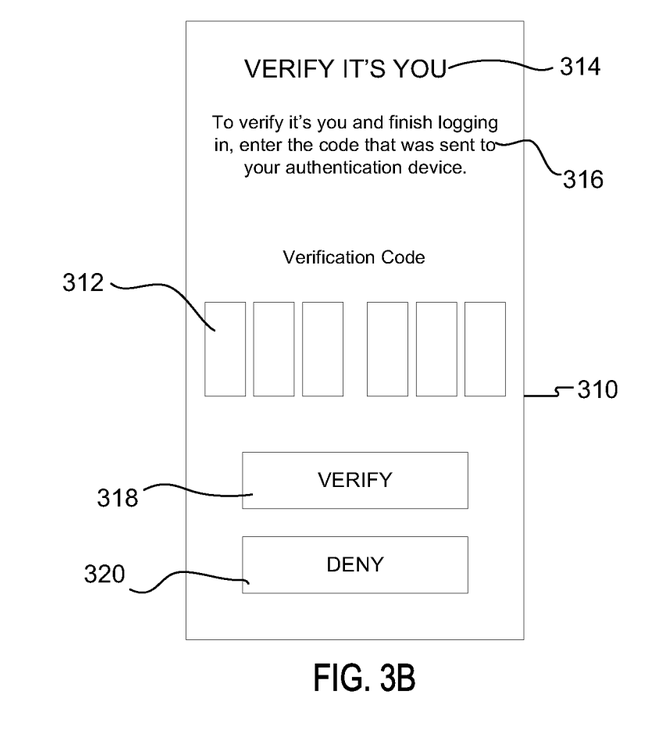

FIGS. 3A-B show an example of an authentication technique, including a push, as one example of an authentication technique. It should be noted that a push may be a primary authentication technique or an alternative authentication technique. In this authentication technique, the user may be asked to enter a code on an access device 114. As shown in FIG. 3A, the user 102 may be presented with a code 302, such as a six-digit code. It should be noted that the code 302 may be any suitable length including numbers, letters, symbols, or pictures, and combinations thereof in various possible examples. The code 302 may be shown in a prompt 300, and the prompt may be presented on the user's 102 authentication device 104, such as a mobile device, when the push is initiated. Shown in FIG. 3A, the prompt may include a header 304 indicating what is needed, such as verification. Message 306 may be shown to aid the user 102 in completing the authentication, such as with instructions on how to complete the authentication. In some examples, the user 102 may be presented with an alternative options button 308, which may include alternate authentication techniques available to the user 102. It should be noted that the alternate techniques available to the user 102 through the alternate option button 308 may be determined by the authentication service 108, a rule or policy associated with the resource 110, user 102, a group of users, combinations of the same, etc., in various possible examples. The length of the code may be configurable.

FIG. 3B shows an example verification interface 310 for inputting the code 302 that may be presented to the user's 102 access device 114, such as a laptop computer. The verification interface 310 may include a header 314 indicating to the user 102 what the purpose of the interface may be. The verification interface 310 may include a message 316 that aids the user 102 in completing verification. The code 302 may be entered into the code verification boxes 312. In some examples, the user 102 may then choose to verify the code by pressing verify button 318. In some examples, the user 102 may not need to press verify button 318, and the code 302 may automatically be authenticated when entered. In some examples, the user 102 may choose to deny the authentication by pressing a deny button 320.

Figure 4:
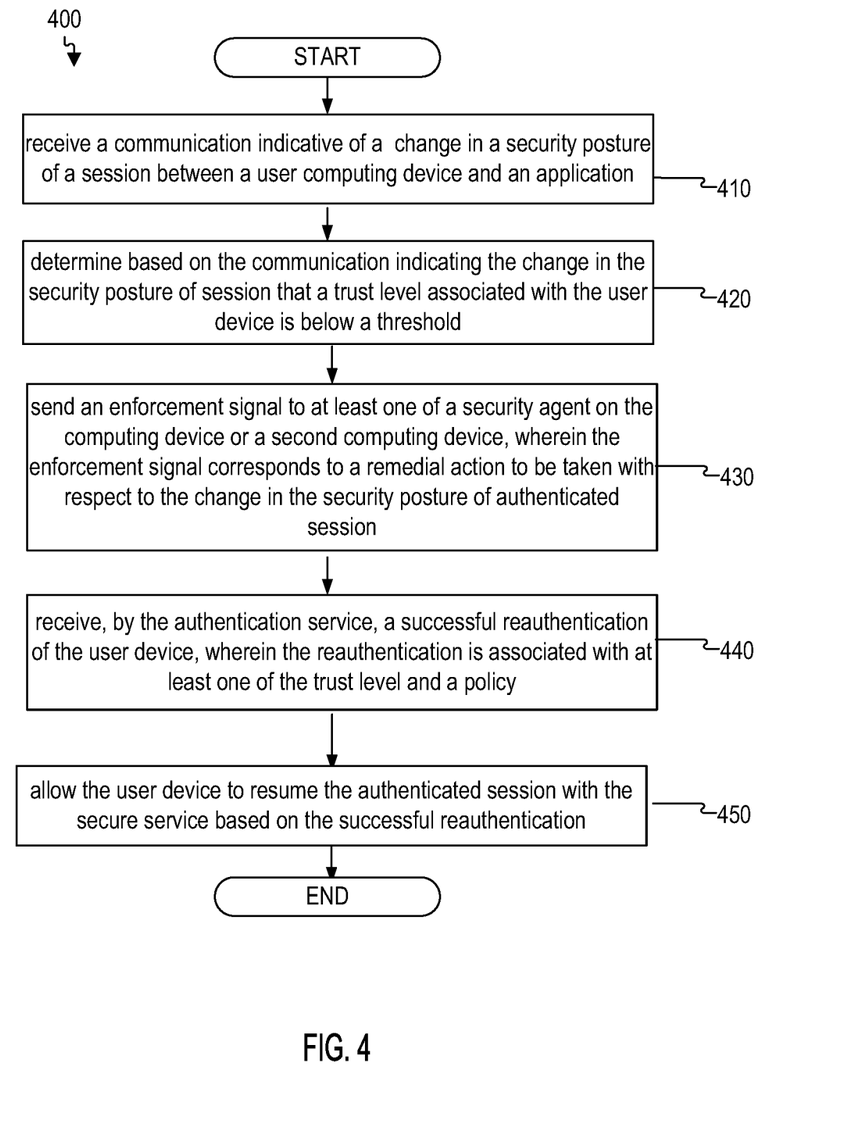
FIG. 4 illustrates an example method of analyzing the secure connection of a system in accordance with some aspects of the present technology.

FIG. 4 illustrates an example method 400 for dynamically assessing the trust and risk associated with a user account, user device, and network and altering the access permissions of the user account and user device in light of the assessed trust and risk. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving a communication indicative of a change in a security posture of a session between a user computing device and an application at step 410. After the authenticated session is created (see e.g., FIG. 2), the system will continuously monitor the user account associated with user 102, the access device 114, the network edge 120, and resource 110, all of FIG. 1. When a change in security posture is identified by the device security agent 118, network security agent 128, authentication service 108, or resource 110, then the devices will send that information to the authentication service 108 and the trust engine 130.

The information received by authentication service 108 can include risk event feedback from the access device 114, network edge 120, resource 110, or received at the authentication service 108. Events can include time intervals between trusted signals, malware detected at the user device, and an abnormally large number of downloads at the user device. Device security agent 118 can then also identify different types of behavior that are outside of normal operating conditions for the access device 114. For example, accessing the resource 110 during atypical work hours, from atypical locations, or from multiple different physical locations at the same time.

The system also can receive information from the authentication service that indicates risk events have occurred. For example, the authentication service can keep track of recent password hacks and determine that a password associated with the user account has been compromised or determine that the password used is particularly easy to crack. It is also possible for the system to determine that multiple IP addresses or atypical IP addresses are being used to attempt to access a secure site. The system can also detect that an account is being attacked via risk vectors associated with multi-factor authentication. The system could recognize any of the push attacks that are fairly common, for example, push spray, push harassment, adversary-in-the-middle, and passcode phishing attacks are common types of attacks, all of which are made more susceptible by "push fatigue." By identifying risk factors associated with the user, user devices, network, and authentication services, the authentication service 108 is able to determine a trust level for the user account and user device, which allows the authentication service 108 to protect the authenticated connection. The trust level can be a score computed by the authentication service 108 or the trust engine 130, or it can be any determination of trust made by the authentication service 108 or trust engine 130. For example, the trust level can be a heuristic measure of the current state of the system, without any need to calculate or determine a trust score.

One example of a framework available to connected devices, e.g., the authentication service 108, network edge 120, resource 110, and access device 114, is an OpenID framework. This is an opensource framework that allows for the transmission, reception, creation of events, and configuring events within the communications described in FIG. 4. This framework will allow the connected devices to communicate when a security event takes place, the content of the event, and any changes to the security environment in light of the changes. The framework also allows for the system to poll for security events and then, when found, transmit to the authentication service 108.

According to some examples, the method 400 includes determining, based on the communication indicating the change in the security posture of the authenticated session, that the trust level associated with the user device is below a threshold at step 420. The authentication service 108 of FIG. 1 receives the information from various sources that indicate risk events are taking place on the access device 114, the network edge 120, the resource 110, or by the user 102. With this information, the trust engine 130 of authentication service 108 is able to dynamically and continuously calculate a trust level or trust score for the user, user account, and user device. The trust engine 130 can, in one example, run a continuous probabilistic assessment of the system based on the information regarding risk events at each point in the system. When the connection is initially authenticated, the trust engine accesses the initial data provided to the authentication service to authenticate the connection. After the initial authentication, the trust engine is continually updating the trust level based on the inputs from the access device 114, network edge 120, and resource 110. The trust engine can be individualized for each of the resources that are utilizing the MFA system, as each resource may have different standards for trusting a user or user device with secure data or secure access to the resource. For example, a resource may indicate that it only wants to provide data to the user if that user is in a work office. So, when an access device provides location information to the authentication service, the trust engine determines that the user device is not at a work location and degrades the trust score of the access device. This allows the policy engine to determine what actions are necessitated by this falling trust score. The trust engine is able to analyze any of the data taken in by the authentication service and is able to weigh it appropriately for each resource.

According to some examples, the method 400 includes sending an enforcement signal to at least one of a security agent on the computing device or a second computing device, wherein the enforcement signal corresponds to a remedial action to be taken with respect to the change in the security posture of authenticated session at step 430. For example, the authentication service 108 of FIG. 1, after determining the change in the security posture, can send an enforcement signal to the network security agent 128 and/or device security agent 118 that alters the ability of the access device 114 to access the resource 110.

The remedial action taken by the security agent can include reducing or eliminating access privileges, which take many forms depending on the trust level determined and why the security posture was changed. For example, if network security agent 128 determines that the access device 114 is infected with a virus or malware that makes all communication from the access device 114 suspected as fraudulent, the network security agent 128 can take multiple simultaneous actions to protect the network and the resource 110. In one example, the network security agent 128 can remove network access from the access device 114. By preventing the access device 114 from having network access, the network security agent 128 can reduce or prevent the virus or malware from spreading on the network. The network security agent 128 can also inform the resource 110 that the access device 114 is compromised so that if the access device attempts to use a different, unprotected network, the resource has knowledge of the compromised state of access device 114.

While removing network access is one possible reduction in access permissions available when trust levels fall below a threshold, there are additional access permissions and remedial actions available to the network security agent 128 and/or device security agent 118. For example, if the access device is not compromised, but just below a trust threshold, the system can alter the authorizations or authentications available to the access device, including the ability to move the access device to a remediation network that has limited connectivity and limited access to network resources. The trust threshold can be any determination made by the system regarding the minimum requirements to access the authenticated session. The trust threshold is not necessarily a number or specific list of security measures undertaken at the user device. Instead, the threshold encompasses a determination of what is acceptable and uses that acceptability to undertake or remove remedial measures. One example is that the system can determine a trust level when a device initially authenticates into the system, and then use any degradation in the trust level as an indication that the user device can no longer access the authenticated session. Remediation can be accomplished by setting up a separate network that operates outside of the secure communications needed to access the resource 110. The network security agent 128 and/or device security agent 118 can also reassign access device 114 to a new or different virtual local area network (VLAN) where access to other devices and network resources is limited while the trust score is below the threshold. The network security agent 128 and/or device security agent 118 can also provide other remediation to an access device falling below a threshold. For example, the security agent 128 and/or device security agent 118 can lower the quality of service provided to the access device. Degrading the quality of service can prevent the access device from transmitting video or video files, audio or audio files, or the bandwidth available to the access device can be reduced. The device security agent 118 and/or network security agent 128 can recognize a specific type of file that is causing the trust score to be below a threshold and block transmission of that type of file.

In further embodiments, remedial actions can take place using a single sign-on (SSO) service. In one embodiment, the access device can access resource 110 using an SSO, which provides an access token to access resource 110. The access token includes certain permissions available to the access device, which can be altered by resource 110. The resource 110 provides the permissions that are used by the SSO service in the access token, and the permissions can be altered when the SSO service and the resource 110 communicate. In one example, the SSO service communicates with the resource 110 periodically to confirm that the user retains the permissions associated with the access token. The SSO service can communicate, via, e.g., an open ID connection, and confirm permissions at certain time intervals. For example, one-minute, five-minute, and thirty-minute intervals can be used. During this communication, the resource 110 can provide a refresh token to the SSO that includes permissions granted to the access device 114.

To continue the above example, the resource 110 can receive the information related to the trust level of the access device 114. Based on this trust level information, the resource 110 recognizes that, based on updating trust score, the access device 114 will lose certain privileges that were previously granted. When the SSO service and the resource 110 communicate next, the refresh token provided to the SSO service will reflect the lower trust score and the reduced permissions available to access device 114. When the SSO service receives the refresh token, it will update the access token to reflect the updated permissions granted to the access device 114, thereby using the access token to dynamically update permissions granted to the access device 114 from resource 110.

The authentication service 108 can also be alerted to events that lead to a lowering of the trust score from the resource 110. The resource 110 or other third-party providers can have their own inputs into a trust determination and can communicate those inputs to the authentication service 108. The authentication service 108 takes in all signals that can impact the trust score and models the trust score based on those inputs. For example, if the resource 110 is aware that the user's password has expired or that the password is weak and doesn't meet the guidelines for resource 110, that information, which is not available to the authentication service 108, can be communicated by the resource to the authentication service 108 to be included in the trust calculation. The trust calculation is customizable for each service, so if the proprietor of a secure site has internal metrics that are important to the trust calculation, those metrics can be provided to the authentication service 108 and included in the trust calculation. Other metrics that can be provided by the resource or other third party are employment status (employees, contractors, probationary employees, etc., having different trust and access rules), security incidents at the resource's system, the importance of specific device types, recency of updating the resource password, lack of VPN connection, amongst others.

Once the remedial action is taken by the network security agent 128 and/or device security agent 118, the system can acknowledge the remedial action taken by alerting the user as to the cause of the remedial action and steps on how to fix the trust score. For example, if the trust score is low due to the access device exceeding the time period for reauthentication, the device security agent 118 can present an alert to the user that reauthentication is needed prior to resuming an authenticated session. The authentication service can also notify the user of other reasons the remedial action was taken and how to potentially resolve the issues and reauthenticate the sessions. For example, if the access device 114 is infected with a virus, the device security agent 118 can notify the user that the device is infected, and prior to reauthentication, the device needs to be secured. After the virus is removed, the access device can begin the process of reauthenticating with the authentication service. In another example, if access is limited because of location, the user can be notified that their current location prevents the access device 114 from creating a secure connection with resource 110. Accordingly, once the location is updated, the user can begin the reauthentication process and get a new trust score.

According to some examples, the method 400 includes receiving, by the authentication service, a successful reauthentication of the user device, wherein the reauthentication is associated with at least one of the trust level and a policy at step 440. For example, after the user is notified and remedies deficiencies associated with the trust score, the authentication process can be restarted so that the access device can join an authenticated session with resource 110. The device security agent 118 and/or network security agent 128 will communicate with the authentication service 108 to update any actions taken in response to the trust score falling below a threshold.

In another embodiment, based on the use of an SSO service to interface with the resource 110, after the resource 110 updates the trust score and the privileges granted to the access device 114 associated with the update, the resource can communicate the update with the SSO service. Specifically, after the resource updates the privileges, at the next communication with the SSO service, the refresh token sent to the SSO service will alter the permission available to access device 114. Based on the updated privileges in the refresh token, the access token used by access device 114 will be updated with the increased privileges from fixing the events that caused a low trust score. Based on the updated access token, the updated privileges will be accessible by the access device 114.

Furthermore, this process of identifying events causing a decreased trust score, fixing the identified event, and reauthenticating the device can iterate, and every time an event is ameliorated, the system can reassess the trust score based on the updated posture of the access device or user. For example, if the location causes a user to fall below the trust score threshold, and the user changes the location of the access device in an attempt to solve that issue, a new process for determining trustworthiness is undertaken, which can identify new events that lower the trust score, such that after fixing one issue, the access device 114 is still below the threshold. In this scenario, the authentication service 108 can alert the user of the new events impacting the trust score so that the user can resolve the outstanding issues, and while being resolved, the authenticated sessions would continue to be paused and/or terminated based on the updated trust score.

According to some examples, the method 400 includes allowing the user device to resume the authenticated session with the secure service based on the successful reauthentication at step 450. Once the updated information is received by the authentication service 108, the trust engine 130 can calculate an updated trust score for the access device 114. If the trust score is above the threshold, then the access device can begin a secure session with resource 110. However, if the trust score is still below a threshold, then further actions will need to be taken at access device 114 to gain access to resource 110. Since the trust score is still below the threshold, the secured communications are still paused.

Alternative embodiments exist where method 400 operates in a similar manner, but instead of interrupting an authenticated session, the system interrupts authorizations provided to the user. In one example, if the user leaves a secured location, the system can temporarily remove authorizations of the user, alert the user to reenter a secured location, and then reauthorize the full scope of the authenticated service for that device. In these circumstances, the authorizations for the user of the authenticated service can be reduced by the remedial actions, yet the user remains authenticated. When reduced authorizations take place, the system may not need to reauthenticate the device, but instead can identify and take remedial actions, confirm that actions have taken place that improve the trust level, and then reauthorize the device on the authenticated session. The mechanism for checking the trust level, remedial actions taken, and reestablishing the authenticated session would operate in the same manner as described herein for method 400, the process would just take remedial actions with respect to authorizations instead of authentication. The system would then identify actions that improve the trust level based on actions taken by the user and reauthorize the device while maintaining the authenticated session. This way either an independent remedial method 400 based on authorizations can take place or a sub-routine within the authenticated session can operate in addition to method 400.

Figure 5:
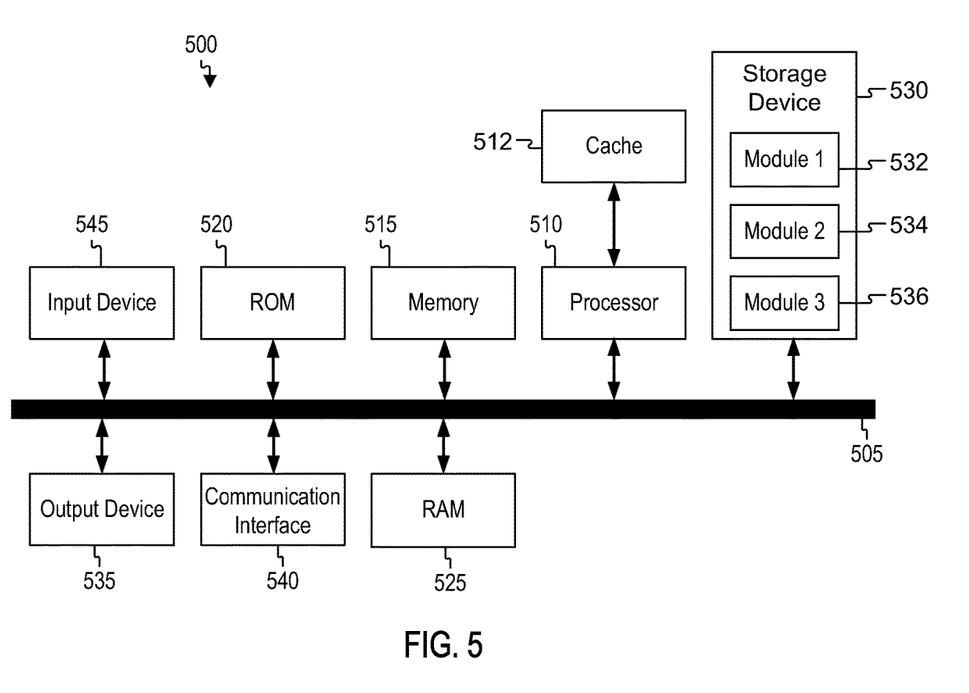
FIG. 5 shows an example of computing system 700, which can be, for example, any computing device that can implement components of the system described herein.

FIG. 5 shows an example of computing system 500, which can be, for example, any computing device making up the access device 114, the authentication device 104, authentication service 108, resource 110, or any component thereof in which the components of the system are in communication with each other using connection 505. Connection 505 can be a physical connection via a bus or a direct connection to processor 510, such as in a chipset architecture. Connection 505 can also be a virtual connection, networked connection, or logical connection.

In some embodiments, computing system 500 is a distributed system in which the functions described in this disclosure can be distributed within a data center, multiple data centers, a peer network, etc. In some embodiments, one or more of the described system components represents many such components, each performing some or all of the function for which the component is described. In some embodiments, the components can be physical or virtual devices.

Example system 500 includes at least one processing unit (CPU or processor) 510 and connection 505 that couples various system components, including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 710 as well as a special-purpose processor where software instructions are incorporated into the actual processor design. Processor 510 may essentially be a completely self-contained computing system containing multiple cores or processors, a bus, a memory controller, a cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, a keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program, or a collection of programs, that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for dynamically enforcing mid-session reauthentication and authorization tuning, the method comprising:
    after a session has been authenticated between a user device and a secure service, continuously monitoring the authenticated session for one or more risk events;
    receiving a communication at an authentication service, wherein the communication is indicative of a change in a security posture of the authenticated session between the user device and the secure service, wherein the communication is based on a determination that the one or more risk events were detected during the continuous monitoring;
    determining based on the communication indicating the change in the security posture of the authenticated session that a trust level associated with the user device is below a trust threshold; and
    sending an enforcement signal to a security agent, wherein the enforcement signal corresponds to a remedial action to be taken with respect to the change in the security posture of the authenticated session, wherein the remedial action includes at least reauthentication of the authentication session, and wherein the reauthentication is associated with at least the trust level.

2. The method of claim 1, wherein the enforcement signal is sent to the security agent on the user device, wherein the security agent is a plug-in for a web browser that can perform the remedial action.

3. The method of claim 1, wherein the enforcement signal is sent using an authenticated shared signal and event framework.

4. The method of claim 1, further comprising:
    setting a time period based on a policy, wherein the time period is associated with the trust level, wherein sending the enforcement signal is based on the time period.

5. The method of claim 1, wherein the trust threshold is determined based on factors specified in a policy configured by a service provider, wherein the policy specifies conditions required to initiate the authenticated session with the service provider and the conditions required to maintain the authenticated session with the service provider.

6. The method of claim 1, further comprising:
    pausing, by the authentication service, the authenticated session based on the trust level associated with the user device being below the trust threshold; and
    sending a request for reauthentication to the user device.

7. The method of claim 6, further comprising:
    receiving, by the authentication service, a successful reauthentication of the user device, wherein the reauthentication is associated with at least one of the trust level and a policy; and
    allowing the user device to resume the authenticated session with the secure service based on the successful reauthentication.

8. The method of claim 6, wherein pausing the authenticated session comprises ending the authenticated session between the user device and the secure service.

9. The method of claim 8, wherein authentication associated with the user device includes a plurality of access permissions associated with a service provider, the method further comprising:
    altering at least one access permission of the plurality of access permissions based on a policy.

10. A computing system for an authentication service comprising:
    a processor; and
    a memory storing instructions that, when executed by the processor, configure the system to:
        after a session has been authenticated between a first computing device and a secure service, continuously monitor the authenticated session for one or more risk events;

receive a communication at an authentication service, wherein the communication is indicative of a change in a security posture of the authenticated session between the first computing device and the secure service, wherein the communication is based on a determination that the one or more risk events were detected during the continuous monitoring;

determine based on the communication indicating the change in the security posture of the authenticated session that a trust level associated with the first computing device is below a trust threshold; and send an enforcement signal to a security agent on a second computing device, wherein the enforcement signal corresponds to a remedial action to be taken with respect to the change in the security posture of the authenticated session, wherein the remedial action includes at least reauthentication of the authentication session, and wherein the reauthentication is associated with at least the trust level.

11. The computing system of claim 10, wherein the second computing device is a network gateway and can perform the remedial action.

12. The computing system of claim 10, wherein the second computing device is a proxy server and can perform the remedial action.

13. The computing system of claim 10, wherein the instructions further configure the system to:

pause, by the authentication service, the authenticated session based on the trust level associated with a user account being below the trust threshold; and send a request for reauthentication to at least one of the first computing device and the second computing device.

14. The computing system of claim 10, wherein the instructions further configure the system to:

receive a second communication at the authentication service, wherein the second communication is indicative of a second change in the security posture of the authenticated session between the first computing device and the secure service; and update the trust level associated with the second computing device based on at least one of the communication, the second communication, and a policy.

15. The computing system of claim 10, wherein the determination of the trust level includes factors specified in a policy configured by the secure service, wherein the policy specifies conditions required to initiate the authenticated session with the secure service and conditions required to maintain the authenticated session with the secure service.

16. The computing system of claim 15, wherein authorization data associated with a user account includes a plurality of access permissions associated with a service provider, wherein the instructions further configure the system to:

alter at least one access permission of the plurality of access permissions based on the policy.

17. A non-transitory computer-readable storage medium, the non-transitory computer-readable storage medium including instructions that when executed by at least one processor, cause the at least one processor to:

after a session has been authenticated between a user device and a secure service, continuously monitor the authenticated session for one or more risk events;

receive a communication at an authentication service, wherein the communication is indicative of a change in a security posture of the authenticated session between the user device and the secure service, wherein the communication is based on a determination that the one or more risk events were detected during the continuous monitoring;

determine based on the communication indicating the change in the security posture of the authenticated session that a trust level associated with the user device is below a trust threshold; and send an enforcement signal to a security agent, wherein the security agent is an application on a network device that can perform a remedial action and wherein the enforcement signal corresponds to the remedial action to be taken with respect to the change in the security posture of the authenticated session, wherein the remedial action includes at least reauthentication of the authentication session, and wherein the reauthentication is associated with at least the trust level.

18. The non-transitory computer-readable storage medium of claim 17, wherein the trust level determination includes factors specified in a policy configured by the secure service, wherein the policy specifies conditions required to initiate the authenticated session with the secure service and conditions required to maintain the authenticated session with the secure service.

19. The non-transitory computer-readable storage medium of claim 17, wherein the instructions further configure the at least one processor to:

pause, by the authentication service, authorizations available within the authenticated session based on the trust level associated with a user account being below the trust threshold; and send a request for authorization to the network device.

20. The non-transitory computer-readable storage medium of claim 17, wherein the instructions further configure the at least one processor to:

receive a second communication at the authentication service, wherein the second communication is indicative of a second change in the security posture of the authenticated session between a computing device and the secure service; and update the trust level associated with a user account based on at least one of the communication, the second communication, and a policy.

* * * * *